United States Patent
Streitz

(10) Patent No.: US 9,933,857 B2
(45) Date of Patent: Apr. 3, 2018

(54) DATA ENTRY KEYBOARD

(71) Applicant: Paul Francis Streitz, Darien, CT (US)

(72) Inventor: Paul Francis Streitz, Darien, CT (US)

( * ) Notice: Subject to any disclaimer, the term of this patent is extended or adjusted under 35 U.S.C. 154(b) by 0 days.

(21) Appl. No.: 13/691,960

(22) Filed: Dec. 3, 2012

(65) Prior Publication Data

US 2014/0152568 A1    Jun. 5, 2014

(51) Int. Cl.
*G06F 3/02* (2006.01)

(52) U.S. Cl.
CPC .................. *G06F 3/0216* (2013.01)

(58) Field of Classification Search
None
See application file for complete search history.

(56) References Cited

U.S. PATENT DOCUMENTS

| | | |
|---|---|---|
| 185,714 A | 12/1876 | Allen |
| 433,765 A | 8/1890 | Collins |
| 558,428 A | 4/1896 | Sholes |
| 560,572 A | 5/1896 | Davis |
| 943,466 A | 12/1909 | Rowell |
| 1,260,543 A | 3/1918 | Howison |
| 1,292,319 A | 1/1919 | Hooper |
| 1,336,122 A | 4/1920 | Banaji |
| 1,342,244 A | 6/1920 | Wolcott |
| 1,506,426 A | 7/1924 | Hoke |
| 2,040,248 A | 5/1936 | Dvorak |
| 2,080,457 A | 5/1937 | Bower |
| 3,698,533 A * | 10/1972 | Illig et al. .................. 400/486 |
| 3,847,263 A | 11/1974 | X |
| 4,519,721 A | 5/1985 | Gardner |
| 4,613,247 A | 9/1986 | Malt |
| 4,655,621 A * | 4/1987 | Holden ............... B41J 5/10 341/20 |
| 4,688,020 A * | 8/1987 | Kuehneman et al. ........ 341/22 |
| 4,847,799 A | 7/1989 | Morita et al. |
| 4,927,279 A | 5/1990 | Morgan |
| 5,073,054 A * | 12/1991 | McDowell .............. B41J 5/10 400/486 |
| 5,170,348 A * | 12/1992 | Hirose ................... 345/173 |
| 5,352,050 A | 10/1994 | Choate |
| 5,483,235 A * | 1/1996 | Hanson et al. ............ 341/20 |
| 5,498,088 A | 3/1996 | Choate |
| 5,793,312 A | 8/1998 | Tsubai |
| 5,836,705 A | 11/1998 | Choate |

(Continued)

FOREIGN PATENT DOCUMENTS

| | | |
|---|---|---|
| AU | 2012100915 | 6/2012 |
| JP | 2002328760 A * | 11/2002 |

*Primary Examiner* — Claire X Pappas
*Assistant Examiner* — Benjamin Casarez
(74) *Attorney, Agent, or Firm* — Lipsitz & McAllister, LLC

(57) ABSTRACT

An apparatus for entering alphabetic data into a computer or other electronic or mechanical devices with a keyboard, wherein: the alphabet letters are placed in an ordered arrangement, the vowels are grouped together, the vowels are all placed on the left side of the keyboard, each vowel has the same color code, the consonants are arranged in groups, the consonant groups are arranged from left to right in alphabetic group order, each consonant group has a specific color code, two groups of consonants have the same color, and letters in each consonant group are arranged vertically across the three rows of the keyboard, with the exception of the JK consonant group which is arranged horizontally on a single row of the keys.

7 Claims, 2 Drawing Sheets

(56) References Cited

U.S. PATENT DOCUMENTS

| | | | |
|---|---|---|---|
| 5,879,089 A | 3/1999 | Arme | |
| 6,053,647 A * | 4/2000 | Parkinson | 400/486 |
| 6,084,576 A * | 7/2000 | Leu et al. | 345/168 |
| 6,348,878 B1 | 2/2002 | Tsubai | |
| 6,445,380 B1 * | 9/2002 | Klein | 345/168 |
| 6,830,396 B2 | 12/2004 | Kurris | |
| 6,900,794 B1 | 5/2005 | San | |
| 6,909,424 B2 * | 6/2005 | Liebenow et al. | 345/169 |
| 6,965,372 B1 | 11/2005 | Woods | |
| 7,008,127 B1 | 3/2006 | Kurris | |
| D524,820 S * | 7/2006 | Baker | D14/486 |
| 7,104,711 B2 | 9/2006 | Kurris | |
| 7,137,749 B2 * | 11/2006 | Wedding | G06F 3/0219 400/485 |
| 2002/0149569 A1 * | 10/2002 | Dutta et al. | 345/173 |
| 2003/0026637 A1 * | 2/2003 | Fu | 400/472 |
| 2003/0038735 A1 * | 2/2003 | Blumberg | C09C 1/3684 341/22 |
| 2003/0052863 A1 * | 3/2003 | Hsia | G06F 3/0202 345/168 |
| 2005/0008418 A1 * | 1/2005 | Green | B41J 5/107 400/486 |
| 2005/0244208 A1 * | 11/2005 | Suess | 400/486 |
| 2006/0082540 A1 * | 4/2006 | Prior | 345/156 |
| 2006/0228149 A1 * | 10/2006 | Harley | 400/486 |
| 2007/0147932 A1 * | 6/2007 | Giles | 400/472 |
| 2010/0271241 A1 * | 10/2010 | Weller | 341/22 |
| 2011/0170927 A1 * | 7/2011 | Ahn | 400/484 |
| 2012/0114406 A1 * | 5/2012 | Cenky | 400/486 |
| 2012/0176320 A1 * | 7/2012 | Burrell, IV | 345/168 |
| 2013/0321281 A1 * | 12/2013 | Lambie | 345/169 |

* cited by examiner

Fig 1 Prior Art, the QWERTY keyboard.
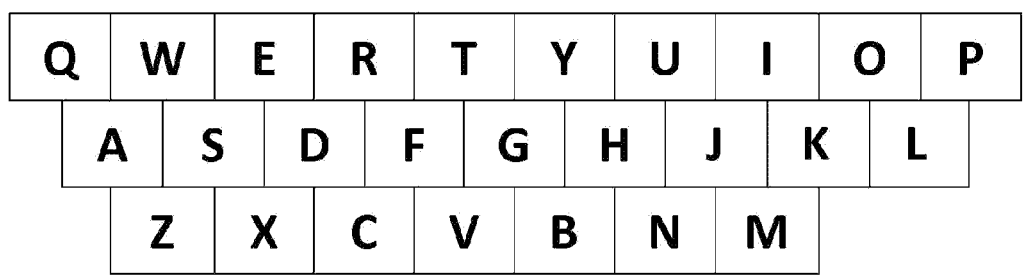
Fig 2 Prior Art, the Dvorak keyboard.
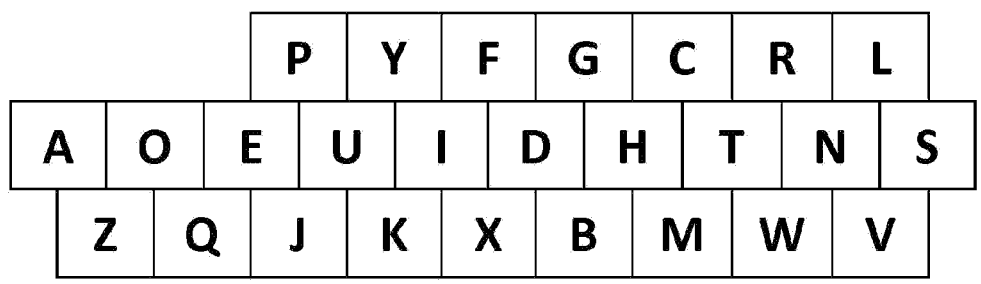

Fig 3 First Embodiment
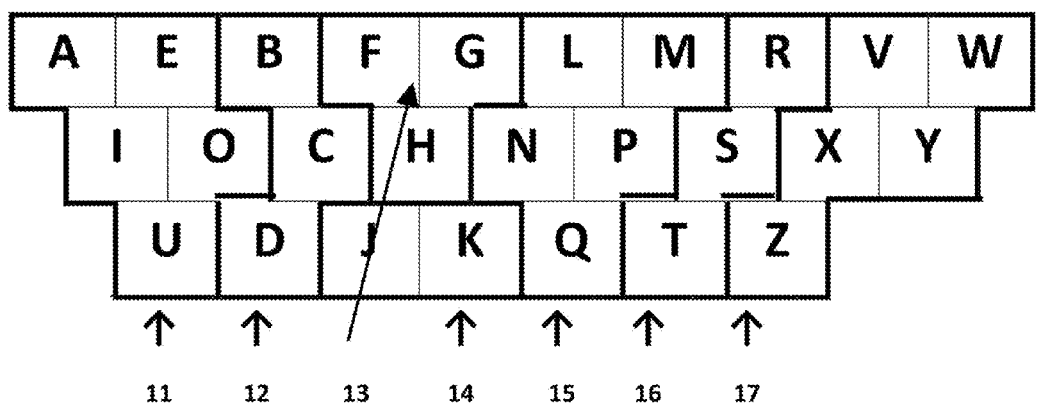

DATA ENTRY KEYBOARD

TECHNICAL FIELD

This invention relates generally to the field of keyboards and more specifically to an apparatus for entering alphabetic data into a computer or other electronic or mechanical devices.

BACKGROUND

The success of the Remington Standard No. 2 typewriter in 1878, which used the QWERTY keyboard, led to the universal adoption of the QWERTY layout. It was an open design and is hailed as one of the successful examples of open standards for an industry. This layout was designed to slow down the rate of typing of the operator. The early mechanical system could not keep up with the rate the keys were being struck. The operator could press keys in sequence faster than the machine could return the previous key to its starting position. There was no consideration given to the ease of learning the keyboard.

The QWERTY keyboard was arranged to scatter the most struck keys to slow down the speed of the operator. For instance, a frequently pressed vowel "a" is pressed by the small finger of the left hand, which is a weak finger and the mechanical typewriters of the time required a forceful stroke to bring the key up to strike the ribbon and make an impression. The QWERTY keyboard was laid out in three rows with 10 keys in the top row, 9 in the second row, and 7 in the third row, with the keys arranged in diagonal columns to allow the keys to depress a lever.

However, the QWERTY keyboard did have one significant design feature: efficiency. The design of the keyboard with three rows with 10 letters in the first row, 9 letters in the second row and 7 letters in the third row. This created a middle home row for the fingers to rest and then every key is then either in the home row, or one row up or one row down.

The QWERTY keyboard to a beginning typist is completely random and each letter has to be painfully memorized by repetition. It takes weeks if not months to train a typist to a high level of skill. Despite this significant limitation, the ubiquitous presence of the QWERTY keyboard on all typewriters made changing to an easier to learn system commercially unfeasible.

Typists were regarded as high skill employees and typing speed and accuracy was considered a desirable feature of employees. Subsequently, there was a search for a faster keyboard. August Dvorak was granted U.S. Pat. No. 2,040, 248 (1936) for a new keyboard. The Dvorak keyboard was designed for maximum speed by carefully measuring the distance the operator had to go to type each letter. Ease of learning the keyboard was not considered. Again, to a beginning typist the keyboard was a random arrangement of letters and the finger to type each letter had to be learned by rote and extensive practice. The Dvorak keyboard layout comprised, from top to bottom, 7, 10 and 9 keys in each of three rows. This differentiated it from the QWERTY design of three rows of 10, 9, and 7 keys. The Dvorak keyboard never made significant headway for typewriters because the marginal difference in speed was more than negated by the long period of training necessary to change from one random arrangement of letters to another random arrangement of letters.

Starting in the 1970's with the introduction of the personal computer, the typing keyboard was separated from the physical computer. The QWERTY keyboard arrangement was adopted by manufacturers for the computer keyboards. Once again, the slight advantage in speed provided by the Dvorak keyboard did not make up for the long learning time. The Dvorak keyboard remains available for computers but only occupies an insignificant share of the market.

Thus, the main keyboard layouts had as their central concern the speed of the typist and developed their systems in response to this concern, but they had opposite goals. The intention of the QWERTY system was to slow down typing speed while the Dvorak system was to speed up typing. The Dvorak and QWERTY designers never paid any consideration to the difficulty of learning the keyboard layout. To a new learner of the keyboard layout, both the QWERTY and Dvorak systems appear as random arrangements that must be painstakingly learned through repetition.

In a study of computer users, the average typing rate was thirty-three words per minute to transcribe a document and the rate for composition was nineteen words per minute. This indicates that the overwhelming majority of computer users are not typing at any great rate of speed. Therefore, improving anyone's rate of typing from sixty-five to seventy words per minute for a skilled typist by having the typist learn a completely new keyboard arrangement is not a worthwhile endeavor that offsets the disability in quickly learning the keyboard. In contrast, providing a keyboard that is easier to learn and easier to use would provide a significant savings in learning times for beginning typists and aid slow typists.

Over the decades typing has changed from a skilled trade of secretarial work to a mass skill such as driving a car. Today, children in grade school learn keyboarding skills in the seventh grade, if not earlier. The mass use of cell phones and computers has made using a keyboard almost universal for all professions. Thus, the QWERTY keyboard system's random arrangement of letters now presents an even greater barrier and considerable waste of time, effort and money learning a keyboard layout meant for a mechanical keyboard of the 1900's.

Based on the above, there exists a need in the art for a keyboard arrangement of letters that enable the beginning learner and any user to quickly and efficiently identify the position of each of the letters on the keyboard. In order to accomplish this, the letters must be arranged in a manner that takes into account the learned knowledge of the user, that is, the learned order of the alphabetic sequence of letters and the distinction between the vowels and the consonants.

SUMMARY OF THE DISCLOSURE

The primary object of the present invention is to provide a computer keyboard that is easier to learn.

Another object of the present invention is to provide a computer keyboard that is laid out in an intuitive manner familiar to any reader of the English language.

Another object of the present invention is to provide a computer keyboard wherein the alphabetic letters are placed in an ordered arrangement that is consistent with the sequence of the Roman alphabet that begins with the letter A and ends with the letter Z, reading left to right.

Other objects and advantages of the present invention will become apparent from the following descriptions, taken in connection with the accompanying drawings, wherein, by way of illustration and example, an embodiment of the present invention is disclosed.

In accordance with an example embodiment of the present invention, there is disclosed an apparatus for entering alphabetic data into a computer or other electronic or mechanical devices, comprising: a keyboard wherein: the alphabet letters are placed in an ordered arrangement of keys on a three alphabetic row keyboard of 10-9-7 keys per row, the vowels are grouped together, the vowels are placed on the left side of the keyboard arranged in alphabetical order, left to right, top to bottom in three rows with AE on the top row, IO on the middle row and U on the bottom row, each vowel has the same color code, the consonants are arranged in groups, the consonant groups are arranged from left to right in alphabetic group order, the consonants within groups (with the exception of the JK group) are arranged vertically across the three rows of the keyboard, and the consonants in each group has a color code.

BRIEF DESCRIPTION OF THE DRAWINGS

The drawings constitute a part of this specification and include exemplary embodiments of the invention, which may be embodied in various forms. It is to be understood that in some instances various aspects of the invention may be shown exaggerated or enlarged to facilitate an understanding of the invention.

FIG. 1 shows the prior art of the QWERTY keyboard;

FIG. 2 shows the prior art of the Dvorak keyboard; and

FIG. 3 shows a keyboard layout of keys in accordance with an example embodiment of the present invention.

REFERENCE NUMERALS

Reference number 11 shows the vowel letter group A, E, I, O, U;

Reference number 12 shows the consonant letter group B, C, D;

Reference number 13 shows the consonant letter group F, G, H;

Reference number 14 shows the consonant letter group J, K;

Reference number 15 shows the consonant letter group L, M, N, P, Q;

Reference number 16 shows the consonant letter group R, S, T; and

Reference number 17 shows the consonant letter group V, W, X, Y, Z.

DETAILED DESCRIPTION

FIG. 1 depicts the QWERTY keyboard. The name of the keyboard is derived from the letters on the left hand side of the top row. The letters are arranged in a format that was designed to slow down the rate of typing on early mechanical typewriters. The placement of the keys has no logical sequence relating to the order of letters in the English alphabet.

FIG. 2 depicts the Dvorak keyboard, U.S. Pat. No. 2,040,248 (1936), wherein the arrangement of the letters is designed to shorten the length of stroke of the most frequently used letters in the English language in order to increase typing speed. The placement of the keys has no logical sequence relating to the order of letters in the English alphabet.

FIG. 3 depicts an example embodiment of the present invention. The keys are placed in an ordered arrangement relating to the understanding and order of the letters in the English alphabet on a three row keyboard of 10-9-7 keys per row. The vowels Group (11) are to the left on the keyboard and color-coded of the same color. The consonants are arranged in alphabetical groups from left to right starting from the right of Group (11). Group (12) consists of the consonants B, C, D, all of the same color; Group (13) consists of the consonants F, G, H, all of the same color; Group (14) consists of the consonants J, K, all of the same color; Group (15) consists of the consonants L, M, N, P, Q, all of the same color; Group (16) consists of the consonants R, S, T, all of the same color as Group (12); Group (17) consists of the consonants V, W, X, Y, Z, all of the same color: each consonant group of letters has a different color-code with the exception of Group (12) and Group (16) which share the same color. The letters of each group are arranged vertically across the three rows of keys, with the exception of Group (14) where the letters JK are arranged on the same row. For example, the letters JK may be arranged on the bottom row of keys.

ADVANTAGES

In accordance with the foregoing descriptions of the difficulty of learning the QWERTY keyboard, several advantages are provided by the embodiments of the present invention as disclosed herein, as follows: the letters of the keyboard are laid out in an arrangement that is apparent to all readers of the English language. This makes learning to type a more intuitive matter based on the foregoing knowledge of the typist, rather than a rote memorization of the position of each letter key through repetition. The beginning typist or a typist familiar with QWERTY keyboard will immediately recognize the logical arrangement of the letters in the embodiment of the new design. The typist will easily determine the general location and then the specific location of any letter on the keyboard. Thereafter, the typist will progress from easily identifying individual letters, to familiarity with the location of all keys, to touch typing. The advantage of the new keyboard is that it significantly reduces the problem of the lengthy period any person must train to learn the ubiquitous QWERTY keyboard.

Accordingly, it will be seen that the invention can be applied to a variety of applications, including typewriters, computer keyboards and smart phones and tablets with touch screens.

While the invention has been described in connection with an example embodiment, it is not intended to limit the scope of the invention to the particular form set forth herein, but on the contrary, it is intended to cover such alternatives, modifications, and equivalents as may be included within the spirit and scope of the invention as defined by the appended claims.

I claim:

1. An apparatus for entering alphabetic data into a computer or other electronic or mechanical devices comprised of a keyboard of three rows of 10-9-7 alphabetic keys, with ten keys on a top row, nine keys on a middle row and seven keys on a bottom row, wherein:

the keys are placed in an ordered arrangement;

vowels are grouped together;

the vowels, AEIOU, are placed on a left side of the keyboard;

the vowels are arranged vertically across the three rows of the keys;

each of the vowels has a same color;

consonants are arranged in consonant groups comprised of BCD, FGH, JK, LMNPQ, RST, and VWXYZ;

the consonant groups are arranged from left to right in alphabetic group order;

the consonants in each of the consonant groups BCD and RST are arranged vertically across the three rows of the keys;
the consonant group JK is arranged horizontally across a single row of the keys;
all of the consonants within both of the consonant groups BCD and RST are of a same first color which is a different color than any other of the consonant groups and the vowels;
each of the consonants within the consonant group FGH are of a same second color;
each of the consonants within the consonant group JK are of a same third color;
each of the consonants within the consonant group LMNPQ are of a same fourth color;
each of the consonants within the consonant group VWXYZ are of a same fifth color; and
the first color, the second color, the third color, the fourth color, and the fifth color each comprise different colors; and
the vowels are arranged in alphabetic order vertically across the three rows of keys with letters AE on the top row, the letters IO on the middle row, and the letter U on the bottom row.

2. The apparatus in accordance with claim 1, wherein the keys are color coded.

3. The apparatus in accordance with claim 1, wherein the keyboard comprises one of a computer keyboard, an electronic keyboard, a smartphone keyboard, a tablet keyboard, and a touch screen keyboard.

4. An apparatus for entering alphabetic data into a computer or other electronic or mechanical devices comprised of a keyboard of three rows of 10-9-7 alphabetic keys, with ten keys on a top row, nine keys on a middle row and seven keys on a bottom row, wherein:
the keys are placed in an ordered arrangement;
vowels are grouped together;
the vowels, AEIOU, are placed on a left side of the keyboard;
the vowels are arranged vertically across the three rows of the keys;
each of the vowels has a same color;
consonants are arranged in consonant groups comprised of BCD, FGH, JK, LMNPQ, RST, and VWXYZ;
the consonant groups are arranged from left to right in alphabetic group order;
the consonants in each of the consonant groups BCD and RST are arranged vertically across the three rows of the keys;
the consonant group JK is arranged horizontally across a single row of the keys;
all of the consonants within both of the consonant groups BCD and RST are of a same first color which is a different color than any other of the consonant groups and the vowels;
each of the consonants within the consonant group FGH are of a same second color;
each of the consonants within the consonant group JK are of a same third color;
each of the consonants within the consonant group LMNPQ are of a same fourth color;
each of the consonants within the consonant group VWXYZ are of a same fifth color;
the first color, the second color, the third color, the fourth color, and the fifth color each comprise different colors;
the letters F and G are arranged on the top row; and
the letter H is arranged on the middle row.

5. The apparatus in accordance with claim 4, wherein:
the consonant group JK is arranged below the consonant group FGH; and
the consonant group JK is arranged on the bottom row.

6. An apparatus for entering alphabetic data into a computer or other electronic or mechanical devices comprised of a keyboard of three rows of 10-9-7 alphabetic keys, with ten keys on a top row, nine keys on a middle row and seven keys on a bottom row, wherein:
the keys are placed in an ordered arrangement;
vowels are grouped together;
the vowels, AEIOU, are placed on a left side of the keyboard;
the vowels are arranged vertically across the three rows of the keys;
each of the vowels has a same color;
consonants are arranged in consonant groups comprised of BCD, FGH, JK, LMNPQ, RST, and VWXYZ;
the consonant groups are arranged from left to right in alphabetic group order;
the consonants in each of the consonant groups BCD and RST are arranged vertically across the three rows of the keys;
the consonant group JK is arranged horizontally across a single row of the keys;
all of the consonants within both of the consonant groups BCD and RST are of a same first color which is a different color than any other of the consonant groups and the vowels;
each of the consonants within the consonant group FGH are of a same second color;
each of the consonants within the consonant group JK are of a same third color;
each of the consonants within the consonant group LMNPQ are of a same fourth color;
each of the consonants within the consonant group VWXYZ are of a same fifth color;
the first color, the second color, the third color, the fourth color, and the fifth color each comprise different colors;
the letters L and M are arranged on the top row;
the letters N and P are arranged on the middle row; and
the letter Q is arranged on the bottom row.

7. An apparatus for entering alphabetic data into a computer or other electronic or mechanical devices comprised of a keyboard of three rows of 10-9-7 alphabetic keys, with ten keys on a top row, nine keys on a middle row and seven keys on a bottom row, wherein:
the keys are placed in an ordered arrangement;
vowels are grouped together;
the vowels, AEIOU, are placed on a left side of the keyboard;
the vowels are arranged vertically across the three rows of the keys;
each of the vowels has a same color;
consonants are arranged in consonant groups comprised of BCD, FGH, JK, LMNPQ, RST, and VWXYZ;
the consonant groups are arranged from left to right in alphabetic group order;
the consonants in each of the consonant groups BCD and RST are arranged vertically across the three rows of the keys;
the consonant group JK is arranged horizontally across a single row of the keys;
all of the consonants within both of the consonant groups BCD and RST are of a same first color which is a different color than any other of the consonant groups and the vowels;

each of the consonants within the consonant group FGH are of a same second color;
each of the consonants within the consonant group JK are of a same third color;
each of the consonants within the consonant group LMNPQ are of a same fourth color;
each of the consonants within the consonant group VWXYZ are of a same fifth color;
the first color, the second color, the third color, the fourth color, and the fifth color each comprise different colors;
the letters V and W are arranged on the top row;
the letters X and Y are arranged on the middle row; and
the letter Z is arranged on the bottom row.

* * * * *